(12) United States Patent
Graham et al.

(10) Patent No.: US 9,344,566 B1
(45) Date of Patent: May 17, 2016

(54) LOYALTY STRUCTURED CALL ROUTING SYSTEM

(71) Applicant: Progressive Casualty Insurance Company, Mayfield Village, OH (US)

(72) Inventors: Melissa S. Graham, Perry, OH (US); Bart Blackburn, Chardon, OH (US); William J. Centrello, Hudson, OH (US); Geoffrey Willingham, Colorado Springs, CO (US); Chris A. Coutts, Solon, OH (US); Shawn L. Kocher, Fairview Park, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

(21) Appl. No.: 14/701,767

(22) Filed: May 1, 2015

Related U.S. Application Data

(63) Continuation of application No. 13/829,764, filed on Mar. 14, 2013, now Pat. No. 9,025,756.

(51) Int. Cl.
*H04M 3/00* (2006.01)
*H04M 3/493* (2006.01)
*H04M 7/00* (2006.01)
*G06Q 30/00* (2012.01)

(52) U.S. Cl.
CPC ............. *H04M 3/4938* (2013.01); *G06Q 30/01* (2013.01); *H04M 7/009* (2013.01)

(58) Field of Classification Search
CPC ............................ H04M 3/4938; H04M 7/009
USPC .................. 379/88.01, 88.13, 265.12, 266.01
See application file for complete search history.

(56) References Cited

U.S. PATENT DOCUMENTS

| | | | | |
|---|---|---|---|---|
| 5,903,873 | A * | 5/1999 | Peterson | G06Q 40/08 705/2 |
| 8,422,659 | B2 * | 4/2013 | Becerra | H04M 3/5166 379/265.12 |
| 2002/0110234 | A1 * | 8/2002 | Walker | H04Q 3/64 379/266.01 |
| 2011/0286586 | A1 * | 11/2011 | Saylor et al. | 379/88.13 |

* cited by examiner

*Primary Examiner* — Van D Huynh
(74) *Attorney, Agent, or Firm* — Brinks Gilson & Lione

(57) ABSTRACT

A context-based call routing architecture includes an interactive voice recognition device configured to processes incoming voice telephone calls through automatic voice recognition. A customer search Web service in communication with the interactive voice recognition device is configured to automatically access customer data and a priority variable stored in a relational database. An intelligent contact management system is configured to route and assign incoming voice telephone calls to a priority queue accessible to a Private Branch Exchange system. The priority variable may be based on loyalty metrics.

20 Claims, 9 Drawing Sheets

LOYALTY STRUCTURED CALL ROUTING SYSTEM

PRIORITY

This application is a continuation of U.S. Ser. No. 13/829,764 titled "Loyalty Structured Call Routing System" filed on Mar. 14, 2013 the contents of which are incorporated herein by reference.

BACKGROUND OF THE INVENTION

1. Technical Field

This disclosure relates to an interactive routing system that prioritizes telephone calls according to a buying or service behavior.

2. Related Art

Call routing is a feature that enables calls to be received and directed to destinations. In some systems calls are received on a first-come first-serve basis. The systems answer the calls, and if necessary, assign them to a queue. The calls are then directed to the next available destination on a first-in-first-out basis. In some systems, the destinations are assigned based on availability. The systems simply process calls in sequence, without creating and assigning different processing paths to different users once within a queue.

Some call routing systems route calls to available destinations based on a dialed number or information entered by the caller. Using self-help functions, such as a telephone keypad on virtual key sets, the systems route calls to the appropriate destinations based on caller supplied information. The information identifies a location or a particular destination a call is attempting to reach. Such systems do not route calls beyond the basic caller data received through the telephone lines.

SUMMARY

A context-based call routing architecture includes an interactive voice recognition device configured to process incoming voice telephone calls through automatic voice recognition. A customer search Web service in communication with the interactive voice recognition device is configured to automatically access customer data and a priority variable stored in a relational database. An intelligent contact management system is configured to route and assign incoming voice telephone calls to a priority queue accessible to an automated exchange system. The priority variable may be based on loyalty metrics.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
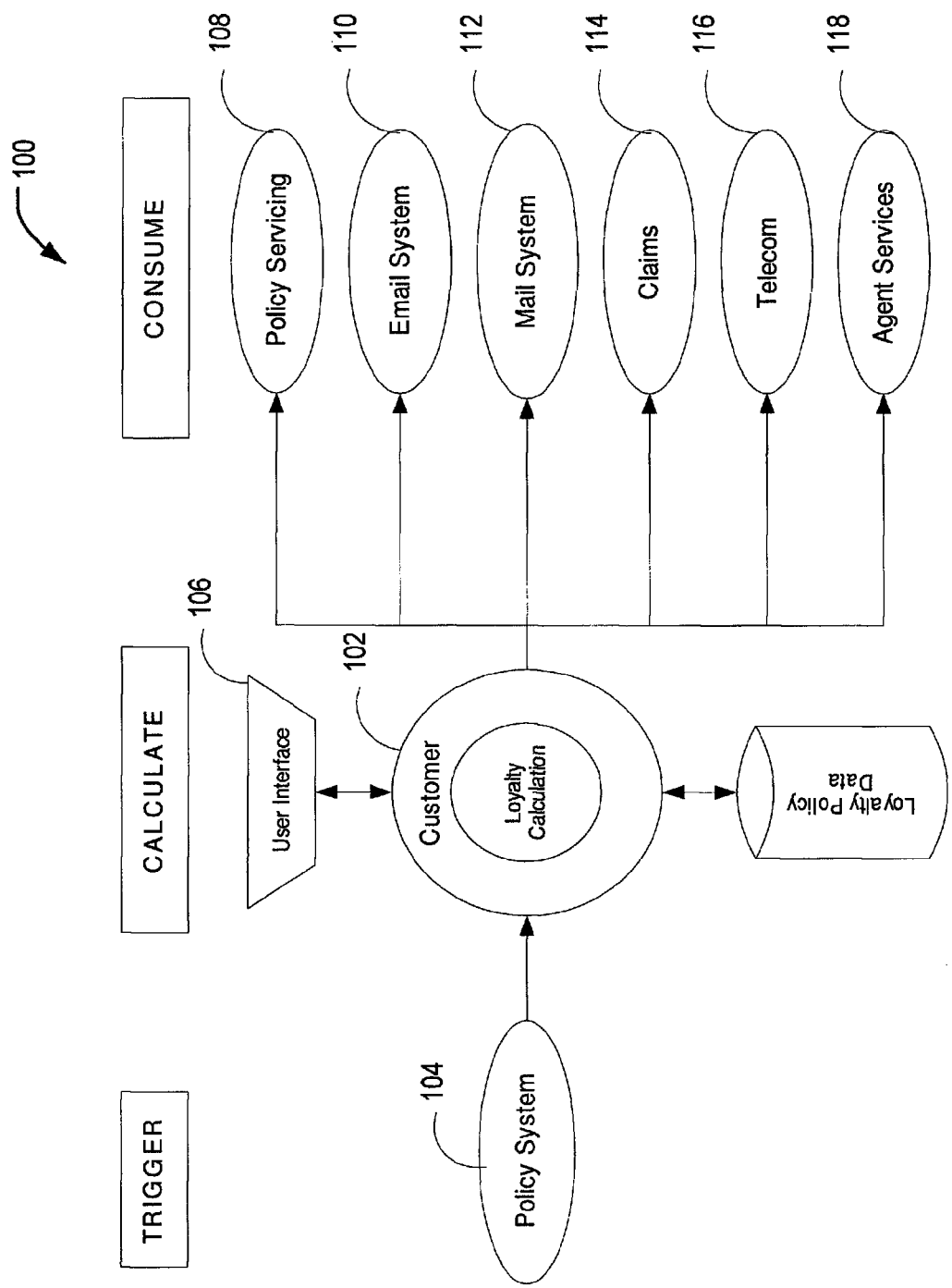
FIG. 1 is a loyalty system map.

This disclosure provides a call routing architecture that delivers innovative call routing to enterprise system and smaller networks. Using context based inputs, Interactive Voice Recognition (IVR) devices that support phone input, such as Dual-Tone Multi-Frequency signaling (DTMF), speech recognition and IVR dialogue, and automatic call distribution routing, the system receives, answers, and processes calls automatically and in most instances without an operator's assistance. The network-based call routing architecture may receive and distribute calls across diverse operating systems. It can reduce queue times, load imbalances, and abandonment rates. The call routing architecture may improve the caller's experience through a priority routing that may dynamically calculate a priority based on a user identification or access priority data retained in a database and automatically transfer the call to a destination with priority instructions.

The destination may comprise one or more instances of a priority queue. The priority queues may comprise a sort ordered queue based on the specified priority. When a call is added to some priority queues, the queues compare the priority value of those existing calls, and re-sort the answering or servicing order of the calls based on the assigned priority or a combination of parameters, such as the call's time-in-the-queue and a priority variable, for example. Calls that have the same priority in a sorted priority queue are serviced in a first-in-first-out (FIFO) order. The priority may be structured on a diverse metric, such as a loyalty program reward (e.g., the priority variable), that encourages loyalty and/or buying behaviors. The loyalty metric may be assigned at the customer level rather than at the product level; meaning the priority or loyalty is not assigned or measured from the product or service acquired, but rather it is assigned or associated with the customer's loyalty to the service provider or retailer.

Some network hosted call routing architectures may include a pre-routing application (e.g., a call routing programmed computer) that interfaces and communicates with an automatic call distribution router in a telecom platform. Through publicly accessible distributed network or Local Area Network (LAN) data links, data is transmitted between the pre-routing application and the automatic call distribution router via a tangible or wireless bus. The pre-routing application may initially receive or intercept and service incoming calls and provide routing and priority instructions that are electronically transmitted (e.g., via a transceiver) to and executed by the automatic call distribution router. The call distribution router transfers calls via a computer telephony controller to one or more instance of a priority queue serving a destination that allows a call to move up in line relative to the calls that are pending or were previously received without a priority designation. An exemplary system may process calls through an IVR and a unified Intelligent Contact Management (ICM) system in the context of a loyalty program. In some exemplary systems, the priority variable is assigned at the customer or user experience level as opposed to a product or a service level.

In an insurance and loyalty environment 100, the computers and programs that comprise the servers or clusters in the customer systems 102 provide the priority value rendered by loyalty calculation software programs retained on a non-transient media (referred to as loyalty calculations) as shown in FIG. 1. The loyalty calculations may be associated with insurance policies delivered through legacy and non-legacy policy serving systems 104. The policy serving systems 104 may provide data related to insurance quoting and sales and changes to insurance policies such as endorsements.

The user interface 106 to the customer system 102 allows an insurer or insurance provider to define, classify, manage, and implement, the business rules that are executed by a business rules engine that establish loyalty eligibility. Some business rules engines comprise software retained in a non-transitory media that executes one or more business rules in a runtime environment. The business rules engine allows the eligibility and classification for loyalty benefits and priority variable to be defined, tested, executed, and maintained separately from the application code that services other call routing functions and enterprise systems.

In FIG. 1, the customer system 102 output is published or retrieved in real time or on a schedule by the insurance policy systems that may comprise the enterprise systems. The insurance policy systems may include an insurance policy servicing system 108, an email system 110, an automated physical/tangible mailing system 112, an insurance claims processing system 114, a telecommunication system 116 and/or an insurance agent system 118 that may consume the loyalty data. Some systems consume loyalty data by providing Uniform Resource Locators (e.g., URLs), Uniform Resource Names (e.g., URNs) or links to loyalty resources distributed about a publicly accessible distributed network or a privately accessible network. An on-line servicing display, for example, may provide loyalty benefits rendered through a virtual insurance policy servicing system 108 that services only insurance policy holders (e.g., not insurance policy agents, not insurance policy personnel, etc.). When provided by a server or cluster that serves content in real time, the servicing process may match a human's perception of time and may comprise a process that occurs at the same rate (or perceived to be at the same rate) as a physical or an external process or at the same rate the data is received at an input from the transmitting source. A server may refer to one or more computers and programs stored on a non-transitory media that responds to commands received from the client devices or applications.

Figure 2:
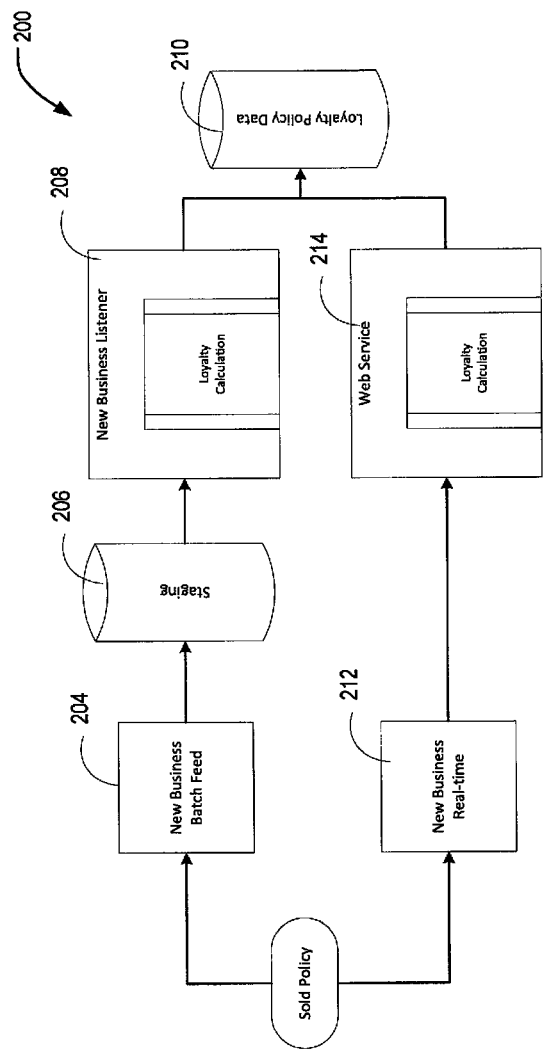
FIG. 2 is a loyalty calculation for new business.
Figure 3:
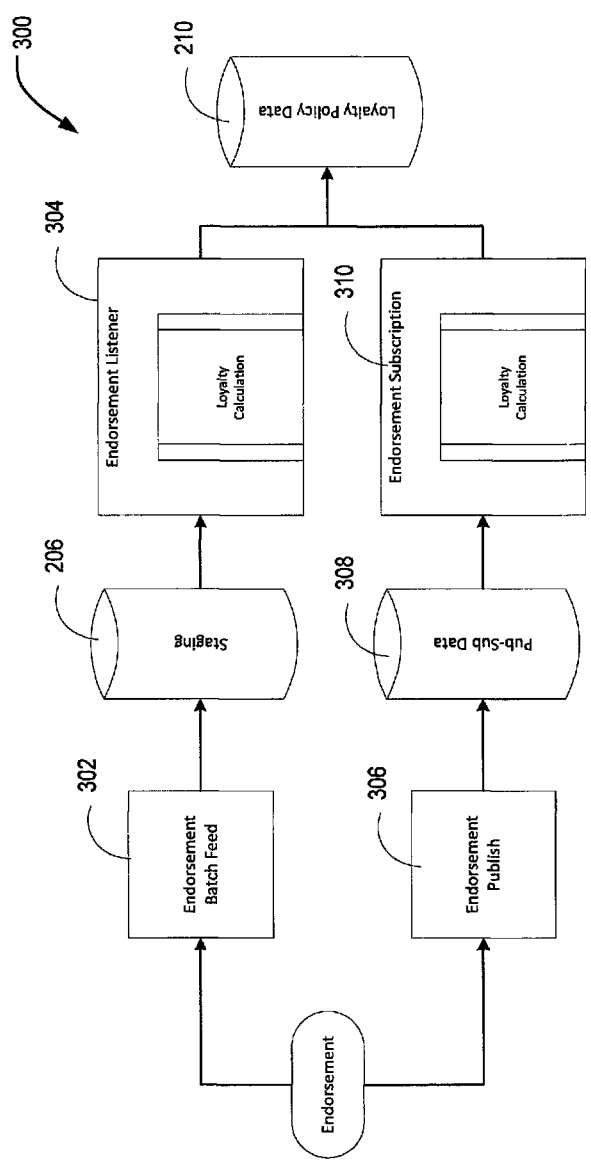
FIG. 3 is a loyalty calculation for endorsements.

Some of the data transmitted by the legacy and non-legacy policy serving systems 104 to the customer system 200 is received from a sales and quoting system 200 (shown in FIG. 2) and an endorsement system 300 (shown in FIG. 3). The new business data feeds may be received by real time applications in a point-to-multipoint communication topology (e.g., many nodes may receive information transmitted from one node) or in batch feed in a point-to-point communication topology. In FIG. 2, the new business batch feeds 204 or semi-real time feeds are received, stored, and lined up as records in a relational database called staging 206. A server application called a new business listener 208 tracks key events such as the transaction when new business is received and/or is staged 206, processes the new business events, and executes or calls the loyalty calculation that is then stored in a second instance of a relational database 210. When new business is received through a real time feed 212, a programmatic interface and business logic receives the new business feed through Web services 214. Web services 214 may allow different sources providing the real time feed 212 to communicate with each other without the time-consuming coding. In some architectures it is not tied to any operating system or programming language. In FIG. 2 Web services 214 process the real time new business and executes or calls the loyalty calculation that is then stored in the second instance of the relational database 210.

In some systems the loyalty calculation that is part of the customer system 102 determines the user's eligibility for a loyalty program, calculates the loyalty level associated with a customer or user, determines if, when, and how a loyalty communication may occur (e.g., media type, such as a voice call, letter, etc.), and how an incoming communication like a telephone call is routed. In FIG. 2, it is the applications that interface the customer system 102, such as the new business listener 208, and the Web services 214 that update the priority variable, loyalty policy data (e.g., loyalty level, loyalty eligibility, etc.) that may include the corresponding insurance policy data in relational database 210.

In FIG. 3, endorsements also modify or update the priority variable or loyalty policy data that is stored in the second instance of the relational database 210. In the endorsement system 300, endorsements are received through a batch feed 302 and through a real time feed, such as an endorsement publisher 306. The endorsement batch feeds 302 or semi-real time real time feeds are received, stored, and update the records in staging 206. The endorsement listener 304, which is also a server application, detects and identifies endorsement events such as the transaction when an insurance policy is changed and/or is staged 206, processes the endorsement events, and executes or calls the loyalty calculation that is then stored in the second instance of relational database 210. When endorsements are published by the endorsement publisher 306 application, the endorsement publications are stored in the publication-subscription database 308. The endorsement subscription application 310 that may be part of the customer system 102 may synchronously or asynchronously monitor the publication-subscription database 308 and detect and process endorsements in real time or on a schedule when endorsement transactions are stored. When detected and processed by the endorsement subscription application 310 or the endorsement listener 304, the customer system 102 recalculates the priority variable and loyalty policy data (e.g., loyalty level, loyalty eligibility, etc.). For example, when an endorsement is added at a renewal, the loyalty level and priority variable may change and will be updated in the relational database 210.

The loyalty calculation software programs stored in a non-transient media (referred to as loyalty calculations) may process one or more inputs and render a unique output. If the loyalty program is used in an exemplary insurance application it may output a rule and one or more classifications or identifications. In an insurance application, some loyalty calculations process a geographic state identifier (e.g., WI, IL, OH, etc.), a risk type (what type of insurance is being processed such as automobile insurance, motorcycle insurance, boating insurance, special lines insurance, etc.), a product version (e.g., some insurance policies include large accident forgiveness, other include renewal guarantees, others may offer concierge services, others may offer young driver discounts, others may offer combinations, etc.), how insurance policies are rated or a rate revision that may be approved by a state's department of insurance, and a rate plan code that may distinguish subsets of insurance policies within a rate revision.

In some systems the loyalty calculation may be based on a customer's "join date" or date the insured made their first purchase. In an insurance application, the join date or cohort date may be the date the insured's policy was originally effective. The loyalty calculation may also be based on the date the insured made their first purchase with an adjustment. Known as a "customer since" date this date represents the earliest date a customer was insured on a policy with the insurance company. If an insurance policy should lapse and a customer later decides to reinstate their insurance after a lapse, some programs credit the interrupted period referred to as the lapse period by measuring loyalty from the date of the insurance policyholder's first purchase with an the insurance carrier. The loyalty calculation may also be based on the insured's policy effective date. The insured's policy effective date is the date when coverage under an existing policy commences.

There are many processes to establish a loyalty level and corresponding priority variable. One process may calculate the difference between an insured's customer since date and the insured's policy effective date (e.g., a lifetime term). Alternatively, the loyalty level may be based on the lifetime tenure an insurance policyholder has with an insurance carrier or alternatively, with one insurance carrier exclusively. Based on the difference, the insured's may be assigned a priority level and priority variable. If the loyalty is based on a number of days and an insurance policy has six month terms, the days of the month may be normalized so the days in successive policy terms are identical. One process assigns the days in the month of January to November (e.g., so January and November are defined as having the same number of days), February to October, March to September, April to August, May to July, and June to December. Some other processes may also modify the priority level and priority variable by the current discounts the insured received to ensure the priority level and priority variable reflect the correct benefit.

Some loyalty levels and priority variables may be assigned across several insurance policies for different insured's covered under common insurance policyholders. Some system's may assign the maximum priority level and priority variable attained under one insurance policy to all insurance policies written on the primary named insured and those covered under those policies. In other words, the maximum priority level and priority variable attained on one of many insurance policies with an insurance carrier may be assigned to the Primary Named Insured (PNI), the insured's spouse, the Secondary Named Insured (SNI), associated Drivers, and/or etc. Some loyalty levels and priority variables may also provide loyalty credit to customers having continuous insurance coverage with a prior insurance carrier when purchasing insurance with a different insurance carrier. Loyalty credit for prior continuous insurance coverage may be capped to a loyalty level or established priority variable, just as larger loyalty benefits may be limited to a length of continuous insurance with the insurance carrier sponsoring the loyalty program.

Figure 4:
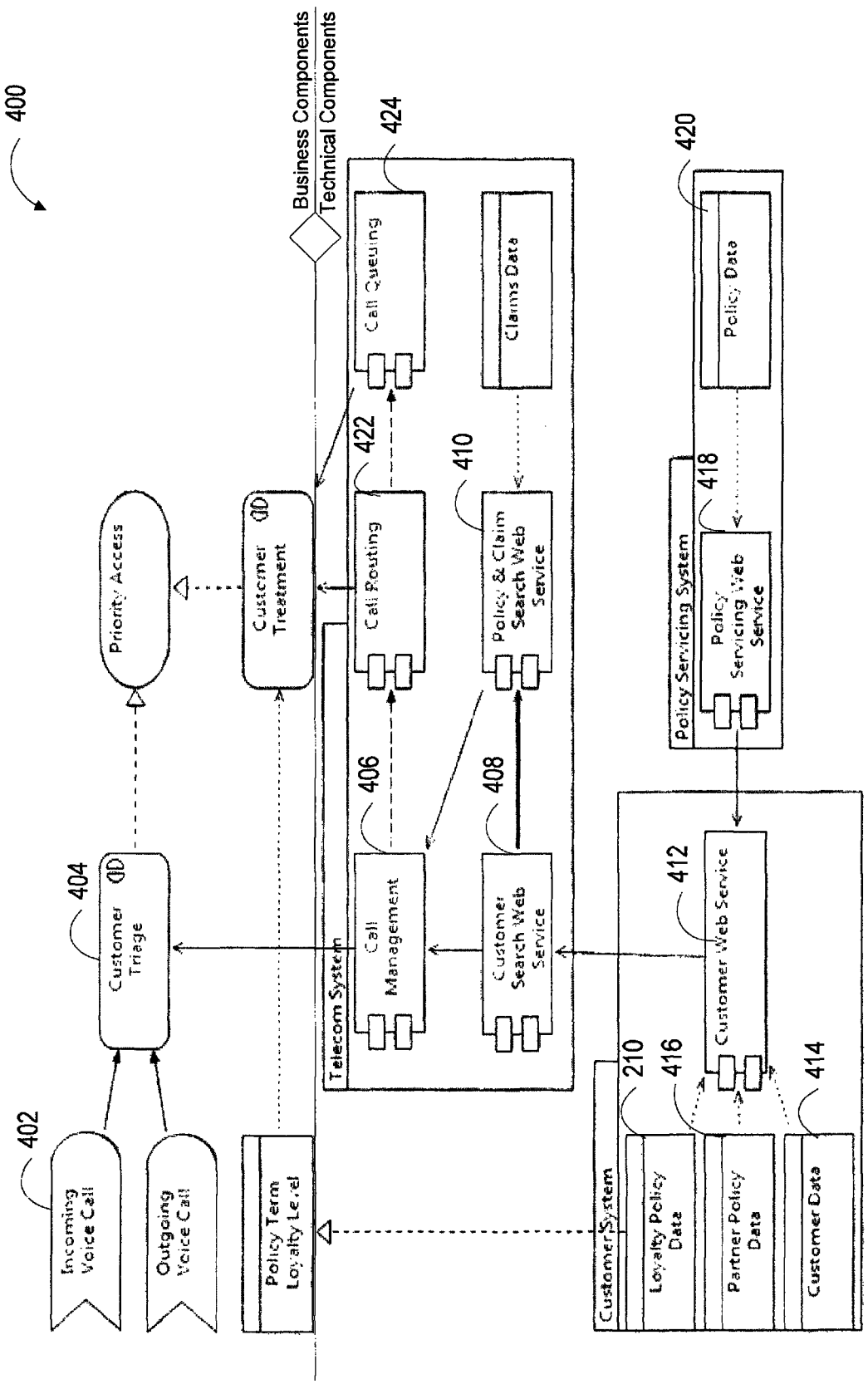
FIG. 4 is a priority call routing architecture.

The priority call routing architecture shown in FIG. 4 receives calls on a first-come first-serve basis that are routed to a customer triage business process 404 that may initially determine the relative purpose behind a voice call. The customer triage business process 404, for example, may set repeat callers to a lower priority (via a queue or other means) so as to not impact first-time callers or infrequent callers. This initial priority designation may be later modified or ignored. Using IVR or SPeech Self Service (SPSS) applications, a call management application 406 will automatically access the calls from the receiving queue collect data from the caller or data received through a telephone gateway to identify the nature of the call. The IVR and SPSS may identify an insurance policy number, a claim number, an insured (via a date of birth or a portion of the caller's social security number, for example) through the customer search Web service application 408 and the policy and claim search Web service 410 in the telecom partition of the call routing architecture. The customer Web service application 412 mines loyalty policy data (e.g., priority variable) from the second instance of a relational database 210, customer data 414, and partner/affiliate policy data 416 that may be retained in the same instance of the relational database, in other instances of the relational database, or may be retained on a cloud-based computing platform. A cloud or cloud based computing platform may refer to a scalable platform that provides a combination of services including computing, durable storage of both structured and unstructured data, network connectivity and other services. Metered services provided by a cloud or cloud based computing platform may be interacted with (pro-visioned, de-provisioned, or otherwise controlled) via one or more customer Web services 412.

Policy servicing information is available to the customer Web services 412 in the policy servicing system partition. The policy servicing Web service 418 serves insurance policy data 420 to the customer Web service application 412. The serving of the insurance policy data (and if applicable, partner/affiliate policy data) prompts the priority call routing architecture to direct the processing to the unified ICM system shown as a call routing application 422 through the call management application 406. If the call is directed to off-site partner or off-site affiliate (that may be served via a disparate Operating System OS on a remote network), the call is routed to the partner's/affiliate's network with or without the priority instructions or priority variable. If the call is routed directly to an individual phone or office number where there is no queue in which priority can be given, then that system may not give priority to the call. If the call remains in system, and the priority variable designates the call as a priority routed call and a previously recorded audio object or dynamically generated audio object informs the caller of their priority access through the IVR or SPSS. The call is then assigned to a priority queue within a Private Branch Exchange system or PBX device (shown as the call queuing application 424) by the ICM. The call queuing application 424 may contain other queue instances including those for servicing insurance policies, claim issues, renewal issues and resolve a caller's need to speak with a licensed agent or an agent s/he previously spoke with, etc. The call queuing application 424 dictates the order in which the calls will be serviced. Calls having a priority variable are answered before those without priority, which deliver the desired customer treatment. Data may then be passed back to the ICM detailing the calling paths and call completions that may be used to provide real-time and historical reporting and dynamic re-creation of a calling session.

Figure 5:
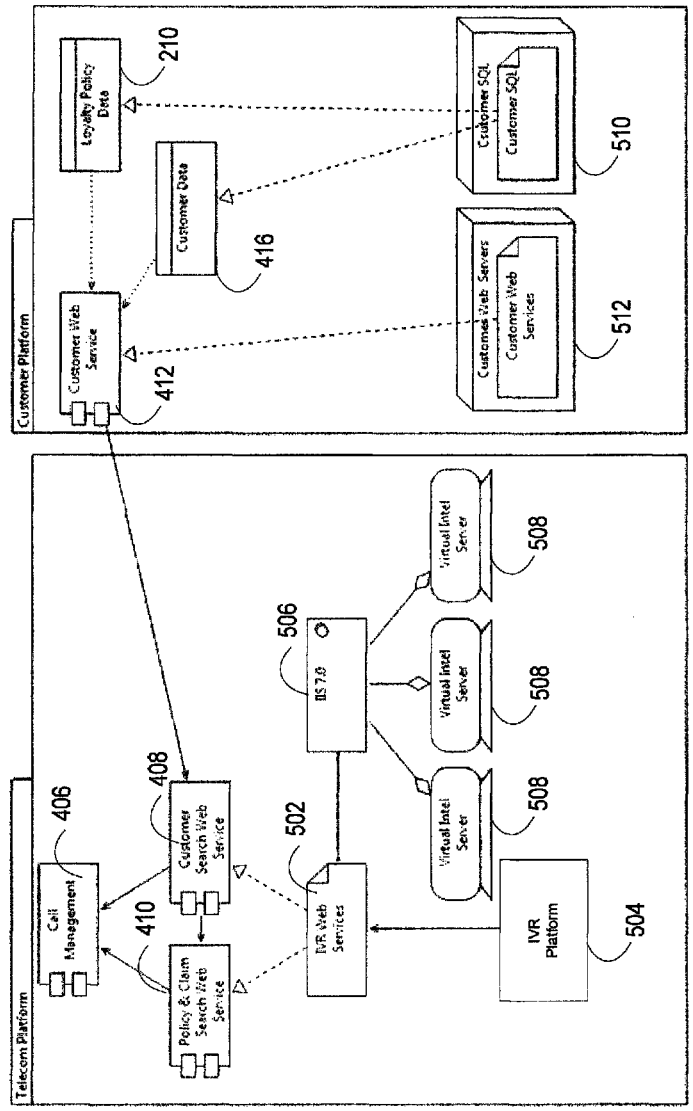
FIG. 5 is the telecom platform and customer platform of FIG. 4.

FIG. 5 provides greater detail of the telecom platform and the customer platform. As shown an IVR platform 504 seamlessly integrates call routing architecture with IP communications. The IVR platform 504 may support VoiceXML, CCXML, a natively based Session Initiation Protocol (SIP) and support HD audio and IPv6. IVR platform 504 further supports inbound and outbound IVR applications such as the IVR Web services application 502, provides centralized management and reporting through Web-based tools. It further supports DTMF and speech-driven IVR, intelligent call routing, IP-PBX solutions, IP call center solutions, call recording, information retrieval, telephone surveys, order status, emergency notifications, virtual receptionists, conferencing solutions and voice verification. Through the IVR Web services application 502, the IVR platform 504 interfaces the Internet Information Services (IIS) server or cluster 506 that may support HTML, HTML5, HTTP, HTTPS, FTP, FTPS, SMTP, NTP, etc. As shown in FIG. 5, it may serve or couple the virtual intelligent servers or server clusters.

Through the customer platform, the customer data 416 and loyalty policy data 210 may be accessed through a database sublanguage used for querying, updating, and managing relational database though a database management system shown as customer SQL 510. The backend customer Web servers 512 are used to as a means to communicate and transfer data between the telecom platform and customer platform.

Figure 6:
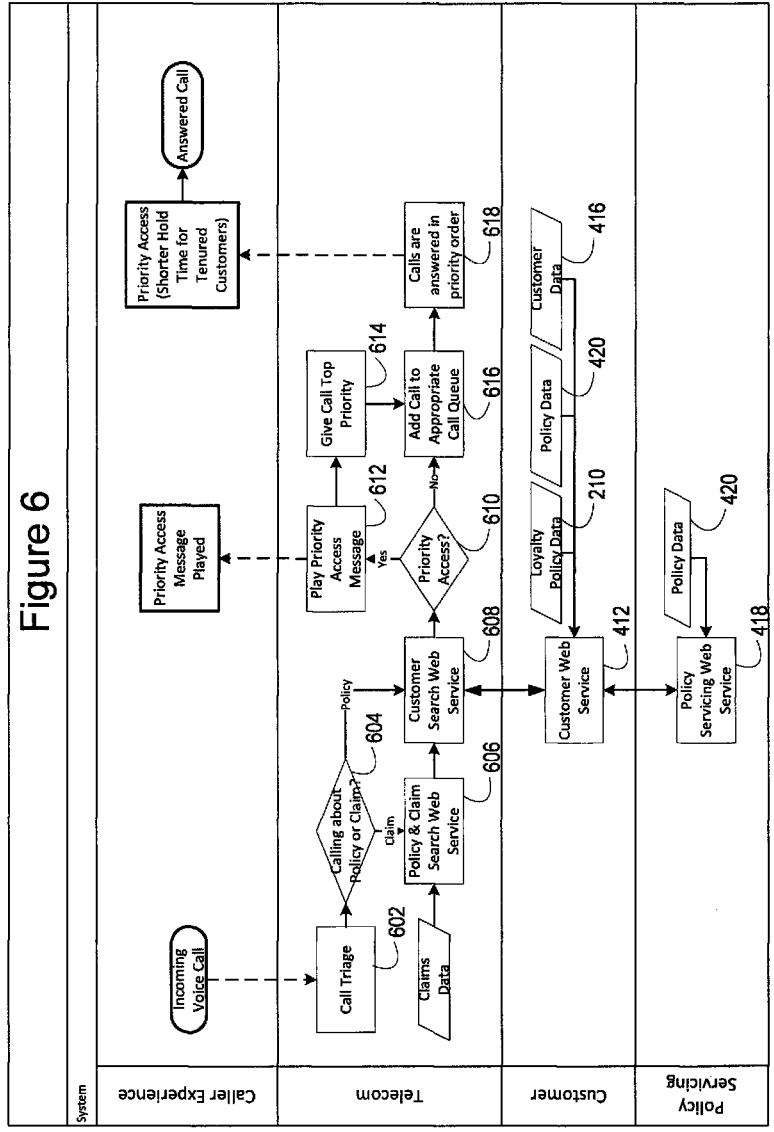
FIG. 6 is an exemplary flow diagram of a call routing process.

FIG. 6 is a flow diagram of a call routing architecture that receives answers, and processes calls automatically. The method processes incoming voice calls on a first-come first-serve basis through a customer triage process 602 that may initially determine the purpose of the voice call. The customer triage process 602, for example, may set repeat callers to a lower priority (via a queue or other means) so as to not impact first-time callers or infrequent callers. The customer triage process collects information about the caller and the intended purpose of the call. The initial priority designation may be pre-empted if the caller is later designated a priority call through a loyalty benefit. Using IVR or SPSS process, a call management process 604 automatically accesses the calls from the receiving queue, collects data from the caller, or process data received through a telephone gateway to identify the nature of the call, whether it concerns an insurance policy, or a claim against an insurance policy. The IVR and SPSS process may identify an insurance policy number, a claim number, an insured (via a date of birth or a portion of the caller's social security number, for example) through a customer search Web service process 608 and the policy and claim Search Web service 606 in the telecom partition of the call routing architecture. The customer Web service process mines loyalty policy data (e.g., priority variable) through the customer Web service process 412 from relational database 210, and may further mine customer data 414, and partner/affiliate policy data 416 that may be retained in the same instance of the relational database, or in other instances of the relational database, or may be retained on a cloud-based computing platform.

Policy servicing information is available to the customer Web services 412 in the policy servicing platform. The policy servicing Web service 418 serves insurance policy data 420 to the customer Web service 412. The serving of the insurance policy data (and if applicable, partner or affiliate policy data) prompts the priority call routing architecture to direct the processing to a unified ICM process through the customer Web service 412. If the call is directed to an off-site partner or affiliate process, the call is routed to the partner's or affiliate's network with or without the priority variable (not shown). If the call remains in the system, and the priority variable designates the call as a priority routed call at 610, an audio object indicating that the call is receiving priority access is executed at 612 through the IVR or SPSS process, and the call is assigned to a priority queue within a PBX process (shown as adding the call to the queue 616) by the ICM process. The call queuing process 616 provides a phone experience to callers until the system can resolve a caller's need to speak with a licensed agent or other representative qualified to assist the caller. The call queuing process 616 dictates the order in which the calls will be serviced 618. Calls designated as high priority through a priority variable are answered before those without priority, which are delivered through priority access. Data may be logged and used to provide real time and historical reporting.

The systems and processes described may be implemented on different technology platforms or groups of logically related hardware and services that correspond to a reporting organization within an enterprise as described above (e.g., the telecom, the customer, and the policy servicing systems). Alternatively, the systems and methods may be implemented on one or many virtual machines in a stand-alone or distributed system. In some alternative systems, the systems and processes do not include one or more telecom systems (e.g., IVR, SPSS, ICM, DTMF, all combinations of systems listed, and/or etc.) and/or one or more customer systems. In other words, some alternative systems comprise one or more (or all) of the subsets of elements that comprise the telecom and customer systems shown in the figures and/or described herein and some do not use any of the recited elements that comprise the telecom and/or customer systems. Some alternative systems and processes provide priority routing to online chat systems/networks, mobile communication systems and networks, and/or claim reporting, servicing, and resolution processes, in addition to or in place of one or more of the systems and processes described herein.

Figure 7:
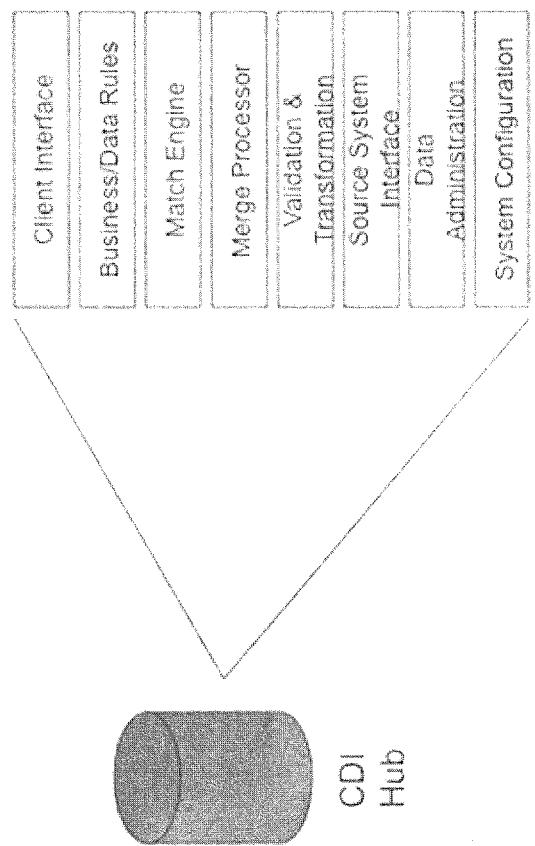
FIG. 7 is a diagram of a Customer Data Integration (CDI) hub.
Figure 8:
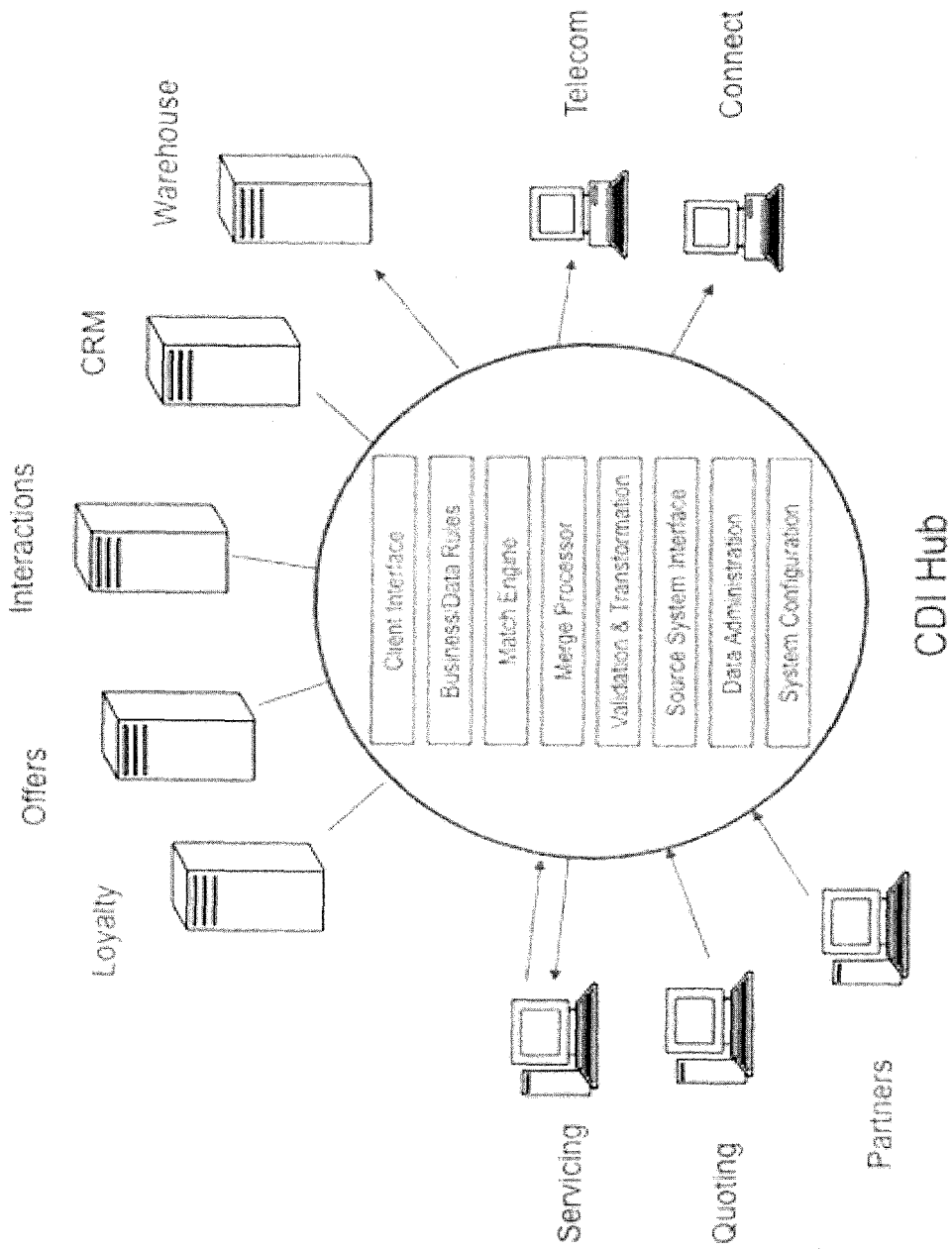
FIG. 8 is diagram of the clients, sources, and systems that may be serviced by the CDI hub of FIG. 7.
Figure 9:
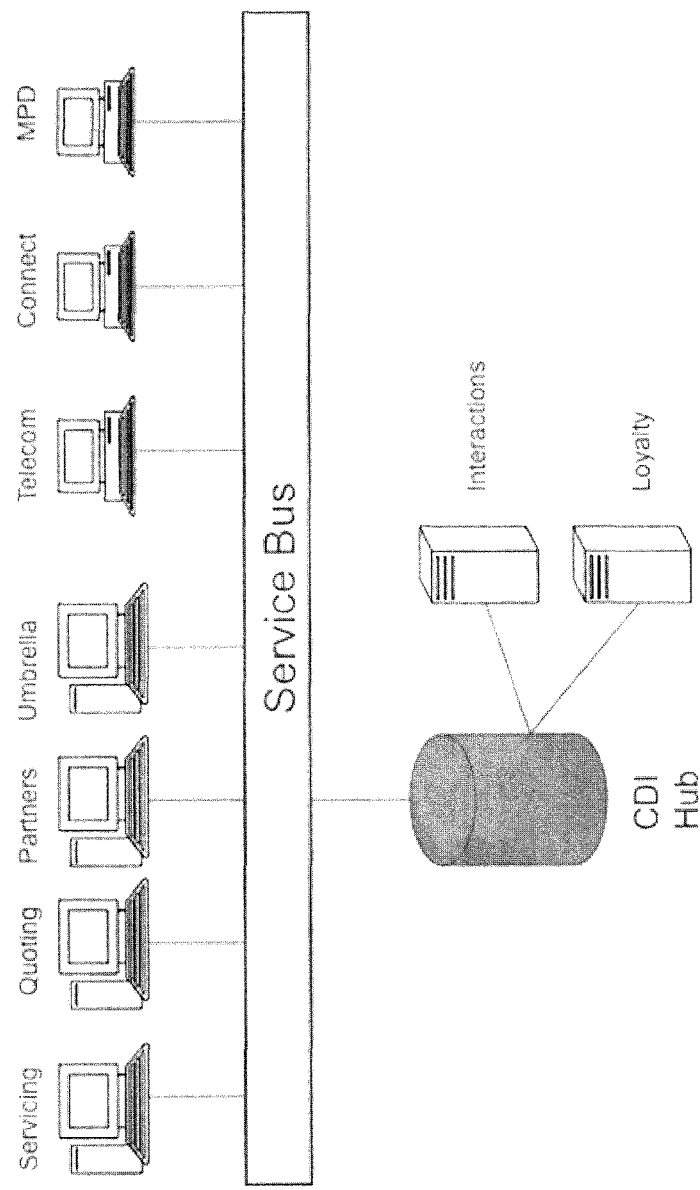
FIG. 9 is CDI hub with a service bus.

The systems and processes described may be implemented through processors or controllers (referred to as devices) that may support a tangible communication interfaces, wireless communication interfaces, or may reside in a master data management systems through different architectures or a combination of architectures. The architectures may comprise network device joining communication lines at a central location like a hub. Some hubs may comprise pointers to the data stored in the source systems to a centralized physical hub such as the architectures shown in FIGS. 7-9. As shown in FIG. 7, a Customer Data Integration hub 702 (CDI hub 702) support client interfaces, execution of business and data rules, real time matching functionality through a matching engine, and provides real time merging, validation, and transformation operations. The CDI hub 702 may further interface originating content sourcing systems, provide data administration, and provide for system integration. The CDI hub 702 may provide a single point of data retrieval, consistent value representation, an accurate and repeatable architecture for merging data and support multiple data sources. As shown in FIGS. 8 and 9 the CDI hub 702 may derive and support loyalty program rewards (e.g., the priority variable) that encourages loyalty and/or buying behaviors, support quoting and sales operations, caller and email logs through an application designated Interactions, and support Customer Relationship Management (CRM), data warehousing, the disclosed call routing architecture, and direct connections to third parties such as agents.

When the systems and methods described above are embodied in software, the software may be encoded in a non-transitory signal bearing medium that resides in a memory or one or more instances of a database like a SQL database. The memory or database may retain an ordered listing of executable instructions for implementing logical functions and may retain one or more engines, servers, or server clusters that access files. Such a system may include a computer-based system, a processor-containing system, or another system that includes an input and output interface that may communicate with a publicly accessible distributed network and/or privately accessible distributed network through a wireless or tangible communication bus through a public and/or proprietary protocol.

A "computer-readable medium," "machine-readable medium," "propagated-signal" medium, and/or "signal-bearing medium" may comprise a non-transitory medium that contains or stores software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" encompasses a range that is largely, but not necessarily wholly, that which is specified. It encompasses all but a significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A context-based call routing architecture comprising:
   an interactive voice recognition device configured to process incoming voice telephone calls through an automatic phone input;
   a customer search Web service coupled to the automatic phone input that is configured to automatically access customer data and a priority variable stored in a relational database; and
   an intelligent contact management system configured to route and assign the incoming voice telephone calls to a priority queue accessible to a Private Branch Exchange system;
   where the priority queue services the incoming voice telephone calls that are provided with a priority variable; and
   where the priority variable is based on a loyalty level assigned across a plurality of insurance policies.

2. The context-based call routing architecture of claim 1 where data is provided by a customer data integration hub.

3. The context-based call routing architecture of claim 1 where the incoming voice telephone call is received by a triage application configured to provide initial routing instructions.

4. The context-based call routing architecture of claim 1 further comprising a speech self-service application configured to mine call data or phone data.

5. The context-based call routing architecture of claim 1 where the intelligent contact management system configured to route and assign the incoming voice telephone calls to a plurality of queues.

6. The context-based call routing architecture of claim 1 where the customer data comprises data associated with an insurance policy.

7. The context-based call routing architecture of claim 1 where the intelligent contact management system is further configured to route the call to a disparate network remote from the context-based call routing architecture.

8. The context-based call routing architecture of claim 1 where the priority variable is based on modified cohort data.

9. A context-based call routing architecture that routes voice calls based on a user's loyalty level comprising:
   an interactive voice recognition device configured to process incoming voice telephone calls through an automatic voice recognition device;
   a customer search Web service coupled to the interactive voice recognition device that is configured to automatically access customer data and a priority variable stored in a relational database; and
   an intelligent contact management system configured to route and assign the incoming voice telephone calls to a plurality of voice telephone queues serviced by a PBX system;
   where the plurality of queues comprise a priority queue that services the voice telephone calls that are provided with the priority variable based on the user's loyalty level with a plurality of insurance carriers.

10. The context-based call routing architecture of claim 9 where the interactive voice recognition device is resident to customer data integration hub that comprises a position of the voice telephone calls in some of the telephone queues is determined by only the priority variable engine and a merge processor.

11. The context-based call routing architecture of claim 9 where the incoming voice telephone call is received by a triage application configured to provide initial routing instructions that are preempted by the priority variable.

12. The context-based call routing architecture of claim 9 further comprising a speech self-service application configured to harvest call data from incoming calls in real time.

13. The context-based call routing architecture of claim 9 where the intelligent contact management system configured to route and assign the incoming voice telephone calls to the plurality of queues based on geographic and product data.

14. The context-based call routing architecture of claim 9 where the customer data comprises data associated with an insurance policyholder.

15. The context-based call routing architecture of claim 9 where the intelligent contact management system is further configured to route the call to telephone networks remote from the context-based call routing architecture with call routing data associated with the context-based call routing architecture.

16. The context-based call routing architecture of claim 9 where the priority variable is based on an insurance policyholder's tenure with the plurality of insurance carriers.

17. The context-based call routing architecture of claim 9 where the interactive voice recognition device is further configured to communicate through a VoiceXML structure.

18. A method of electronically routing a voice telephone call, comprising:

1) receiving voice telephone calls through an interactive voice recognition device configured to process incoming voice telephone calls through an automatic voice recognition device;
2) generating a priority variable;
3) accessing customer data and the priority variable through a relational database; and
routing and assigning the voice telephone calls to a plurality of voice telephone queues serviced by a queuing system;
where the plurality of queues comprise at least one priority queue that services the voice telephone calls that are provided with the priority variable; and
where the priority variable represents a loyalty level assigned across a plurality of insurance policies.

19. The method of claim 18 where the method is further configured to assign a maximum priority level and the priority variable attained under one insurance policy to all insurance policies written on the insurance policyholder.

20. The method of claim 19 where the method is further configured to assign the priority variable to all insured covered under the insurance policies written on the insurance policyholder.

\* \* \* \* \*